Patented Sept. 22, 1953

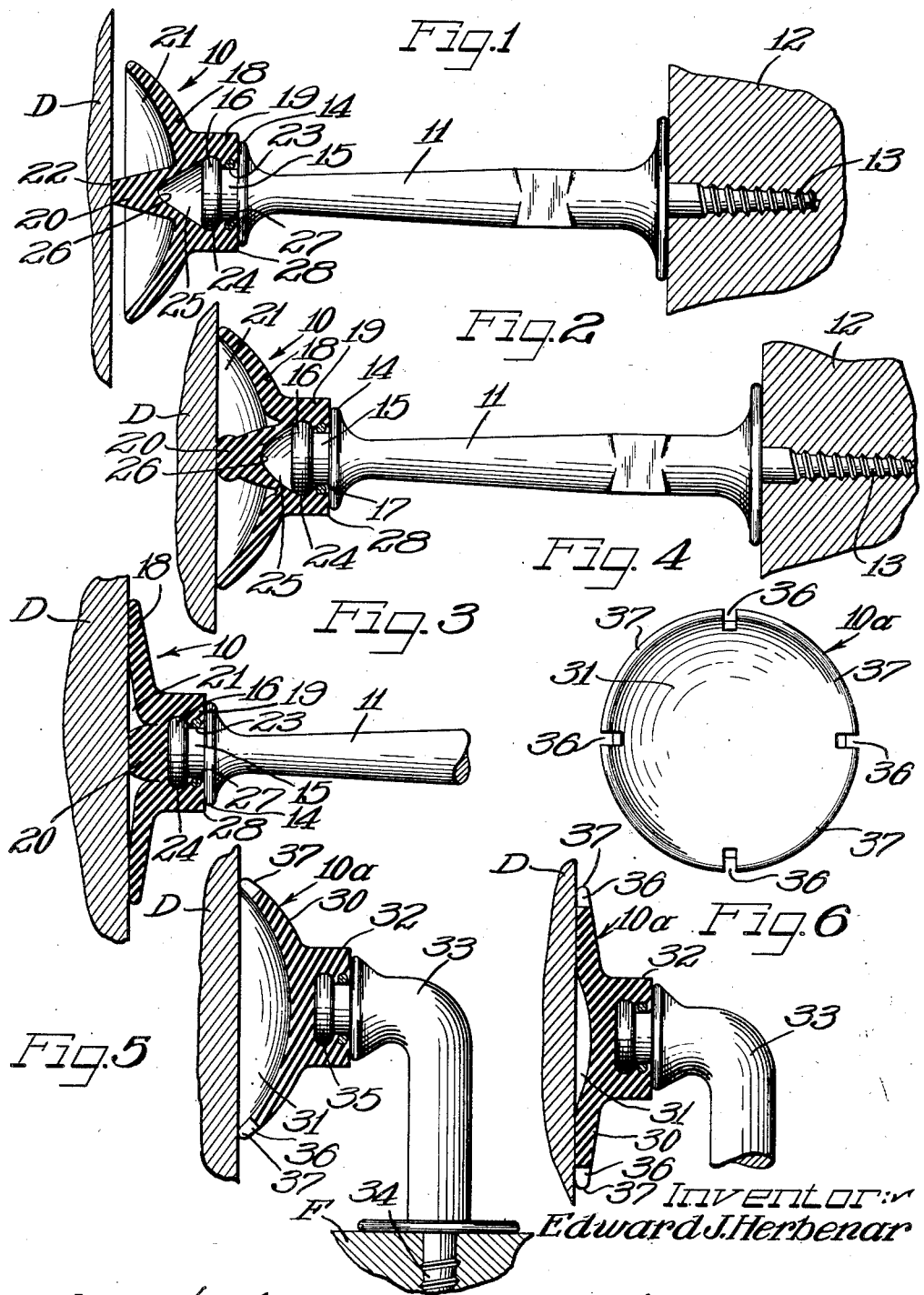

2,652,585

UNITED STATES PATENT OFFICE 2,652,585

COMBINATION BUMPER AND RETAINER

Edward J. Herbenar, Detroit, Mich.

Application August 21, 1951, Serial No. 242,843

4 Claims. (Cl. 16—86)

This invention relates to a simple device for cushioning impacts of sudden forces and for retaining a member in fixed relation when the member is pressed thereagainst.

Specifically, the invention deals with a door bumper and retainer having a resiliently deformable non-retaining portion and a suction cup retaining portion.

The invention will be hereinafter specifically described as embodied in a door bumper and retainer, but it should be understood that the devices of this invention are generally useful for cushioning impact blows and for fixedly retaining imperforate members pressed thereagainst.

The illustrated preferred forms of the invention are adapted for convenient mounting on standard door stop carriers, but the devices of this invention are adapted to be mounted on or carried by any type of carrier including conventional wood screws, bolts, or the like fasteners.

It is, then, an object of this invention to provide a combination door stop and holder which will releasably engage the door to cushion an impact force and which will hold the door in an open position when the door is pressed gently thereagainst.

Another object of this invention is to provide a suction cup with a bumper to cushion the impact of a swinging door and to retain the door in open position when the door is pressed steadily thereagainst.

A further object of this invention is to provide a rubber suction cup with a recessed boss adapted to be fixedly retained on a door stop holder and having a bumper projecting beyond the suction cup face thereof to cushion the impact of a door or the like before the suction cup is deflected sufficiently for retaining the door.

A still further object of the invention is to provide a rubber suction cup with a notched periphery dividing the circumference of the suction face into a plurality of deflectable wings or segments adapted to serve as bumpers before the suction face is deflected sufficiently to create a retaining suction in the cup area thereof.

A further specific object of the invention is to provide a rubber suction cup adapted to act as a retainer and a bumper wherein the concave suction cup face thereof has a centrally projecting rubber lug adapted to be deflected into the suction cup cavity without breaking the suction seal.

Other and further objects of the invention will be apparent to those skilled in the art from the following detailed description of the annexed sheet of drawings which, by way of preferred examples only, illustrates two embodiments of the invention.

On the drawing:

Figure 1 is an elevational view, with parts in vertical cross section, of a combination door stop bumper and retainer illustrating the free position of the device at the moment of impact by a door.

Figure 2 is a view similar to Figure 1 but illustrating the impact cushioning effect of the bumper prior to deflection of the suction cup.

Figure 3 is a fragmentary view similar to Figures 1 and 2 but illustrating the door holding or retaining position of the device and the manner in which the bumper flows into the cavity of the device so as not to interfere with the suction grip.

Figure 4 is a front elevational view of a modified form of device according to this invention.

Figure 5 is an elevational view, with parts in longitudinal cross section, illustrating the device of Figure 4 on an angle type carrier and the position of the device at the moment of impact by a door.

Figure 6 is a view similar to Figure 5, but illustrating the position of the device in its door holding or retaining condition.

As shown on the drawing:

The device 10 of Figures 1 to 3 is illustrated as mounted on a conventional door stop carrier 11 which is secured in a wall or mopboard 12 by means of a screw 13 on one end of the carrier. The opposite end of the carrier has an outturned flange 14 with a central cylindrical projecting portion 15 and a head 16 on the end of the cylindrical portion. A retaining groove 17 is thereby provided between the head 16 and flange 14.

The device 10 is composed of rubber in the form of a suction cup and has a flexible circular cup-defining skirt 18, a recessed boss or head 19, and a deflectable lug 20. The skirt 18 surrounds a concave suction chamber 21 and the lug 20 projects through the central portion of the chamber beyond the periphery of the skirt. The lug has a flat end 22 adapted to be engaged by the face of a door D. The lug diverges from the flat end 22 to the central bottom portion of the chamber 21.

The boss or head 19 has a reentrant recess therein with a cylindrical entrance throat 23, a groove 24 at the inner end of the throat 23, and a cavity 25 converging from the groove 24 to an apex 26 in the lug 20.

A metal snap ring 27 is embedded in the boss or head 19 around the throat 23.

The reentrant recess of the boss or head 19 is adapted to receive the head 16 of the door stop or carrier member 11 in the groove 24 thereof with the shank 15 of the stop member 11 snugly seated in the throat 23 and the flange 14 bottomed against the end face 28 of the boss or head. The retainer ring 27 is split and expansible to accommodate passage of the head 16 through the throat 23 but when the head is seated in the groove 24 the ring will contract due to the inherent springiness of the metal thereof and the throat 23 will be snugly engaged around the shank 15. The device 10 is thereby fixedly held in the groove 17 between the flange 14 and the head 16 of the carrier or door stop member 11.

The cavity 25 beyond the head 16 of the door stop 11 is in alignment with the lug 20. As shown in Figure 1, when the door D first engages the flat end face 22 of the lug 20, it is spaced from the periphery of the skirt 18. As illustrated in Figure 2, however, the lug 20 is deflected under the impact of the door to assume a distorted position partly entering the cavity 25 due to interparticle flow of the rubber. As shown, the lug 20, in effect, has a hollow base which can flow into the cavity. Therefore, when the door is impacted against the lug 20, the lug will deform to cushion the impact blow before the door engages the periphery of the skirt 18. This cushioning effect will serve as a resilient bumper for impact forces created by a sudden thrusting of the door against the face of the lug.

As shown in Figure 3, when the door D is gently pressed against the device 10, the skirt 18 will be deflected to materially decrease the size of the suction chamber 21 surrounded thereby while the lug 20 will be pushed into the cavity 25 so as not to interfere with the suction clamp maintained by the deflected skirt. As shown, the skirt assumes a flat position and engages the door around a relatively wide peripheral band area to provide a suction seal for the chamber 21. The door is thereby fixedly held by the suction cup effect, and the carrier 11 for the device will retain the door in open position.

The device 10 can be conveniently substituted for the conventional rubber bumper on the end of a conventional door stop 11, since the reentrant recess in the head or boss 19 of the device 10 can be designed so as to receive the conventional metal head end of a door stop. The retainer ring 23 embedded in the boss 19 is effective to fixedly mount the device on the door stop so that the suction grip on the door can be broken by pulling the door away from the suction cup without pulling the suction cup off of the carrier.

A sudden impacting of the door against the device 10 will only result in a deflection of the bumper lug 20, and if the impact is great enough to deflect the bumper into the suction area 21, so that the skirt 18 will be deflected, no suction grip will be created due to the suddenness of the impact. The bumper is thereby effective to repel the door with a cushioned thrust. On the other hand, when it is desired to maintain the door in an open position, it is only necessary to firmly press the door against the device 10, whereupon the bumper will be forced into the cavity and the skirt will be deflected as shown in Figure 3 to be flattened into sealing relation with the door so that the suction area 21 will be effective to retain the door tightly against the device.

In the embodiment shown in Figures 4 to 6, the device 10a is a rubber suction cup with a deformable skirt 30 defining a concave suction face 31 and with a recessed head or boss 32 having a reentrant recess receiving the head end of an angle type door stop 33 which is secured in the floor F by a screw 34 on one end thereof. The door stop 33 has the conventional head 35 on the other end thereof facing the door and receiving the boss 32 therearound. A retainer or snap ring holds the boss on the door stop.

The skirt 30 has a periphery with four radial notches 36 therein. These notches 36 divide the skirt into four peripheral wing portions 37 which are adapted to be deflected without creating a suction in the suction area 31. Thus, as shown in Figure 5, when the door D impacts against the peripheral wings 37, it will deflect these wings rearwardly but the skirt 30 will not be flattened sufficiently so as to create a seal for the suction cup area 31 thereof. As a result, the wings 37 act as resilient bumpers in the same manner as the lug 20. They engage the door D first and when deflected under sudden impact, will act as resilient repelling cushions to absorb the impact.

As shown in Figure 6, when the door D is pressed gently and firmly against the suction face side of the device 10a, the skirt 30 will be flattened and the suction area 31 will be sealed to retain the door against the device. In this position, the wings 37 are flattened and extend radially outward. The sealing band area of the skirt is radially inward of the wings.

It should be understood that the devices of this invention can be secured on conventional door stops with any suitable retainers including cement or the like. The snap on retainer rings 27 are convenient preferred forms of retainers. It will also be understood that the bumpers of the devices can be peripherally or centrally located and will absorb and repel sudden impacts as when a door slams thereagainst. However, a gentle but firm pressing of the door to deflect the skirt of the devices will create a suction grip that will hold the door in open position. The devices can be made of any resiliently deformable material, such as rubber, synthetic rubber, plastics, and the like. A durometer hardness of about 40 to 60 is very satisfactory for the material.

It will be understood that modifications and variations may be effected without departing from the scope of the novel concepts of the present invention.

I claim as my invention:

1. A combination door stop and holder which comprises a rubber suction cup having a mounting head, a resiliently deformable skirt, and a resiliently deformable central lug in the skirt and projecting beyond the skirt, said lug adapted to be deflected by a door for cushioning a sudden impact of the door, and means adapted for accommodating deflection of the lug into said skirt by a door for creating a suction gripping engagement therewith to fixedly retain the door.

2. A combination door stop and bumper which comprises a rubber suction cup having a central boss adapted to be secured on a carrier, a fragmental spherical skirt projecting from said boss, a central lug projecting from the central portion of said skirt, and said boss having a recess axially aligned with said lug to accommodate deflection of the lug, the terminal end of said lug having a flat face lying beyond the periphery of the skirt for cushioning an impact blow of a door, and said skirt being deflectable into suction gripping contact with the door while the lug is deflected into the recess of the boss.

3. A combination door stop and retainer which comprises a rubber suction cup having a cylindrical boss with a reentrant recess therein, a fragmental spherical skirt depending from one end of said boss and surrounding a suction cavity, a resiliently deflectable central lug projecting through said cavity in alignment with said boss and terminating in a flat end face beyond the periphery of the skirt, said recess in said boss converging into said lug in axial alignment therewith to form a cavity for receiving the lug when deflected by a door, and said skirt being deflectable into a flattened position for sealing engagement with the door to maintain a vacuum in the cavity surrounded thereby for retaining the door thereagainst.

4. A door stop and holder which comprises a carrier having a headed end, a rubber suction cup having a boss with a reentrant recess adapted to receive said headed end of the carrier, means in said boss for retaining the headed end of the carrier in the recess, a fragmental spherical skirt depending from said head and defining a suction cavity, a central lug projecting through said cavity from said boss, and said recess in the boss extending into the lug, said lug having an end projecting axially beyond the periphery of said skirt and said recess in the boss adapted to receive the lug when deflected into the suction cavity.

EDWARD J. HERBENAR.

References Cited in the file of this patent
UNITED STATES PATENTS

| Number | Name | Date |
|---|---|---|
| 735,415 | Schrodel | Aug. 4, 1903 |
| 952,845 | Wendlinger | Mar. 22, 1910 |
| 2,194,997 | Butler | Mar. 26, 1940 |
| 2,454,414 | Taylor | Nov. 23, 1948 |